(12) United States Patent
Barreiro et al.

(10) Patent No.: US 9,745,000 B2
(45) Date of Patent: Aug. 29, 2017

(54) MULTIFUNCTIONAL SUPPORT FOR MOUNTING FUNCTIONAL ELEMENTS OF A MOTOR VEHICLE

(71) Applicant: RENAULT s.a.s., Boulogne-Billancourt (FR)

(72) Inventors: Emmanuel Barreiro, Villiers le Mahieu (FR); Julien Le Roy, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 207 days.

(21) Appl. No.: 14/378,526

(22) PCT Filed: Feb. 5, 2013

(86) PCT No.: PCT/EP2013/052218
§ 371 (c)(1),
(2) Date: Aug. 13, 2014

(87) PCT Pub. No.: WO2013/120728
PCT Pub. Date: Aug. 22, 2013

(65) Prior Publication Data
US 2015/0166116 A1 Jun. 18, 2015

(30) Foreign Application Priority Data
Feb. 13, 2012 (FR) ..................... 12 51320

(51) Int. Cl.
*B62D 25/12* (2006.01)
*B62D 25/08* (2006.01)
(Continued)

(52) U.S. Cl.
CPC ........... *B62D 25/12* (2013.01); *B60Q 1/0483* (2013.01); *B62D 25/081* (2013.01);
(Continued)

(58) Field of Classification Search
CPC ........ B60H 1/28; B60R 13/07; B62D 25/081; B62D 25/10; B62D 25/105; B62D 25/12; B62D 25/163; E05C 19/006; E05C 19/007
(Continued)

(56) References Cited

U.S. PATENT DOCUMENTS

| | | | |
|---|---|---|---|
| 5,145,457 A * | 9/1992 | Tanigaito | B62D 25/081 296/192 |
| 6,588,525 B2 * | 7/2003 | Brogly et al. | 180/69.21 |
| 2004/0108753 A1 | 6/2004 | Bruderick et al. | |

FOREIGN PATENT DOCUMENTS

| | | |
|---|---|---|
| EP | 1 806 274 | 7/2007 |
| FR | 2 899 554 | 10/2007 |
| FR | 2965240 A1 * | 3/2012 |

OTHER PUBLICATIONS

French to English translation of FR 2,965,240; retreived Aug. 4, 2015 via PatentTranslate on the EPO website, www.epo.org.*

(Continued)

*Primary Examiner* — Jason S Daniels
(74) *Attorney, Agent, or Firm* — Oblon, McClelland, Maier & Neustadt, L.L.P.

(57) ABSTRACT

A multifunctional support configured for mounting of functional elements of a motor vehicle on the vehicle body, the multifunctional support including: securing elements for securing the multifunctional support to at least one associated element of the body, or a fender support and/or a liner of an A-pillar; and mounting elements for maintaining at least one headlamp and/or a bonnet on the multifunctional support, the headlamp performing a lighting function and the bonnet closing a vehicle engine compartment when in the closed bonnet position. The support includes mounting elements for maintaining all or part of a header tank on the multifunctional support, the header tank configured to col- (Continued)

lect water and/or separate air to be conveyed to a ventilation circuit of the vehicle.

17 Claims, 5 Drawing Sheets

(51) Int. Cl.
   *B62D 25/16* (2006.01)
   *B60Q 1/04* (2006.01)
   *F16M 13/02* (2006.01)
(52) U.S. Cl.
   CPC ......... *B62D 25/082* (2013.01); *B62D 25/163* (2013.01); *F16M 13/02* (2013.01)
(58) Field of Classification Search
   USPC ............................... 296/192, 193.03, 193.11
   See application file for complete search history.

(56) References Cited

OTHER PUBLICATIONS

International Search Report Issued Mar. 6, 2013 in PCT/EP13/052218 Filed Feb. 5, 2013.
French Search Report Issued Sep. 28, 2012 in French Application No. 1251320 Filed Feb. 13, 2012.

* cited by examiner

Figure 10

MULTIFUNCTIONAL SUPPORT FOR MOUNTING FUNCTIONAL ELEMENTS OF A MOTOR VEHICLE

TECHNICAL FIELD OF THE INVENTION

The invention concerns a multifunctional support for mounting functional elements of a motor vehicle on a body of the vehicle.

The invention also has for subject matter a motor vehicle including at least one such multifunctional support.

PRIOR ART

In the construction of a motor vehicle, it is necessary to mount and to position very numerous functional elements (for example bodywork elements, lighting elements, sealing elements, etc.) relative to the structural body of the motor vehicle.

The functional elements are conventionally positioned independently of one another on the geometrical frame of reference consisting of the body. Fixing may be effected in a plurality of operations and necessitate successive delicate adjustments both of possible clearances and possible flush fitting of the elements relative to one another.

This approach to mounting and positioning is fastidious because of the geometrical complexity to be complied with in the precise positioning of the functional elements, the large number of parts that constitute the assembly and the iterative adjustments that their correct placement necessitates. Moreover, this mounting and positioning principle employs heavy and costly tooling.

These general problems must be solved in particular in the case of positioning and mounting on the motor vehicle body a hood intended to close the engine compartment and/or a water box and/or a headlamp.

Moreover, an articulated hood mounting can prove problematic for practical or cost reasons. Such mounting is obtained, for example, by providing a pivot-type articulation between the hood and a part called the "hood support" intended to support the hood when it is in the closed position. Such a hood support is itself fixed to a structural element of the body. This type of hood support participates in mounting and positioning but it must be held in the closed position (against upward opening movement) with the aid of a complementary locking element offset relative to the hood support.

In current solutions, the water box is produced in one piece over all its length considered in a longitudinal direction of the water box, this direction often being oriented in a direction transverse to the vehicle.

There is more and more frequently severe congestion in the upper part of the engine compartment, as notably described in the documents US 2004/01 08753 and EP 1 806 274. Fitting a one-piece water box becomes very difficult, implying difficult access for tools, notably screwing tools, necessitating numerous precise manipulations (sideways movement) of the water box because of the limited access. Depending on the architecture, fitting sometimes becomes impossible in practice. This problem is particularly real when two bulky elements such as hood supports intended to support the hood are disposed on either side of the water box in the longitudinal direction of the water box in a direction transverse to the body of the vehicle. In effect, if these hood supports protrude toward the interior of the engine compartment, they form an obstacle constraining the fitting of the water box. These hood supports are referred to as protruding inwards in the sense that they penetrate into the interior space of the engine compartment in the direction transverse to the vehicle.

Additionally, the water box must frequently be fitted above a windshield wiper mechanism fixed previously, for example on a firewall upper crossmember. The windshield wiper spindles then pass through openings in the water box provided for this purpose within the thickness of the water box. The windshield wiper spindles are inscribed in vertical planes substantially perpendicular to the curve formed by the firewall upper crossmember (this curve is formed by the shape of the lower edge of the windshield and the engine bay interior crossmember). Fitting the water box is therefore subject to the constraint of having to pass the windshield wiper spindles through the water box via orifices provided for this purpose. The water box is moved along a path substantially inscribed in a vertical plane that is longitudinal with reference to the longitudinal direction of the vehicle (the (X, Z) plane as defined hereinafter). This arrangement prevents any movement of the water box in the direction transverse to the vehicle (sideways movement in the direction Y defined hereinafter), which limits the ease of fitting the water box, in particular when it is necessary to avoid such hood supports in order to position the water box under them.

There is therefore a real need to provide a solution enabling easy fitting of the water box independently of the architecture of and congestion in the upper part of the engine compartment.

Finally, a headlamp is conventionally mounted on a front crossmember that is itself fastened to the rest of the body. Such a crossmember can also carry the grille. Such mounting is open to improvement.

OBJECT OF THE INVENTION

The present invention aims mainly to eliminate these drawbacks of the prior art by proposing a multifunctional support enabling simplification of the operations of mounting given functional elements on the body of a motor vehicle.

Another object is to propose an alternative to existing solutions for mounting a headlamp.

Another object is to provide a solution enabling mounting and positioning of the hood on the body offering an alternative to an articulated mounting.

Another object is to provide a solution enabling facilitation of the retention of the hood in the closed position against movement toward an open position.

Another object is to provide a solution enabling secure and easy fitting of the water box independently of congestion in and the architecture of the upper part of the engine compartment of the motor vehicle.

According to the invention the multifunctional support is intended for mounting functional elements of a motor vehicle on a body of the vehicle, the multifunctional support including:
  fixing elements intended for fixing the multifunctional support to at least one associated element of the body, such as a fender support and/or an A pillar liner,
  mounting elements intended to retain on the multifunctional support at least one headlamp intended to provide a lighting function and/or a hood intended to close an engine compartment of the vehicle in a closed position of the hood.

The support is characterized in that it includes mounting elements intended to retain on the multifunctional support part or all of a water box intended to collect water and/or to separate it from air to be routed into a ventilation circuit of the vehicle.

The multifunctional support may include elements for mounting the hood on the multifunctional support and the elements for mounting the hood on the multifunctional support may include positioning elements configured so as to prevent all movement having a vertical component between the multifunctional support and the hood when it is in the closed position.

The positioning elements may include a lower abutment element intended to immobilize the hood in the downward direction when it is in the closed position.

The positioning elements may be configured so as to be activated by sliding of the hood relative to the multifunctional support in a first direction and to be deactivated by sliding of the hood relative to the multifunctional support in a second direction opposite the first direction, notably in a substantially horizontal direction.

The positioning elements may include at least one first member intended to be engaged by sliding in a second member fastened to the hood on sliding of the hood relative to the multifunctional support in the first direction.

Either the first or second member may include at least one fixing lug which, on sliding of the hood in the first direction, is inserted in a retaining housing equipping either the first or second member, respectively.

The multifunctional support may include mounting elements intended to retain part of the water box and these mounting elements intended to retain part of the water box may include an end closure element of the water box, said end element being fastened to the multifunctional support and configured so as to be able to support one longitudinal end of a central closure element of the water box.

The central element is intended to collect water and to route it to the end element. The end element may include a water guiding element configured to collect water routed by the central element and to channel it off the multifunctional support.

The end element may include an upper face on which the corresponding longitudinal end of the central element is intended to come to bear by overlapping it from above.

The end element may include a waterproofing element intended to be disposed between the end element and the central element.

The end element may include a bearing element intended to come to bear in watertight manner on a firewall upper crossmember of the body.

The multifunctional support may be a one-piece part.

According to the invention, a motor vehicle includes at least one multifunctional support as defined above, an associated element of the body of the vehicle, such as a fender support and/or an A pillar liner, to which said at least one multifunctional support is fixed, and at least one functional element retained on the multifunctional support, chosen from the following:
- all or part of a water box intended to collect water and/or to separate it from air to be routed into a ventilation circuit of the vehicle,
- at least one headlamp intended to provide a lighting function,
- a hood intended to close an engine compartment of the vehicle in a closed position of the hood.

The vehicle may include two multifunctional supports disposed on respective opposite sides of the hood and/or the central closure element of the water box along a direction transverse to the vehicle.

The vehicle may include a locking mechanism varying between a locking configuration preventing deactivation of the positioning elements and an unlocking configuration allowing activation of the positioning elements.

The locking mechanism may be configured so that the passage of the locking mechanism from the unlocking configuration to the locking configuration causes sliding of the hood relative to the multifunctional support in the first direction.

BRIEF DESCRIPTION OF THE DRAWINGS

Other advantages and features will emerge more clearly from the following description of particular embodiments of the invention given by way of nonlimiting example and represented in the appended drawings, in which.

DESCRIPTION OF PREFERRED EMBODIMENTS OF THE INVENTION

The description is given with reference to an orthonormal system of axes (X, Y, Z) conventionally associated with a motor vehicle, in which X is the front-to-rear longitudinal direction of the vehicle directed toward the rear, Y is the right-to-left transverse direction that is horizontal and perpendicular to X and directed toward the right, and Z is the vertical direction directed upward.

Identical reference numbers are employed for elements fulfilling the same function in the two embodiments of a multifunctional support in accordance with the invention.

A multifunctional support 10 is intended for mounting particular functional elements (specified later) of a motor vehicle on a body of that vehicle.

Figure 3:
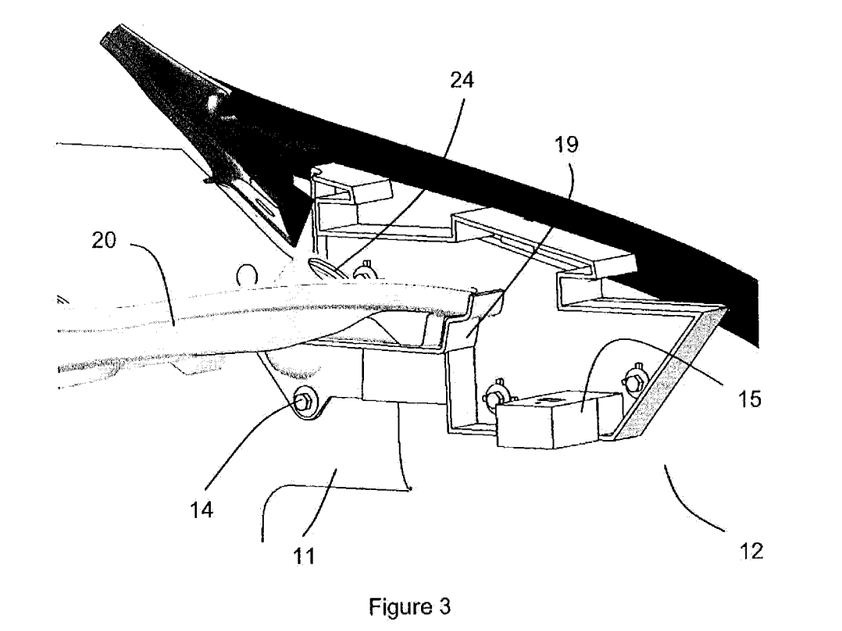
FIGS. 3 and 4 represent partially in perspective one example of an arrangement for a motor vehicle in accordance with the invention utilizing the multifunctional support from FIGS. 1 and 2.

The multifunctional support 10 includes fixing elements intended to fix the multifunctional support 10 to at least one associated element of the body, notably providing for demountable fixing of the multifunctional support 10. In other words, the multifunctional support includes part of fixing means intended for demountable fixing of the multifunctional support 10 on the associated body element, this part of the fixing means cooperating for this purpose with a complementary part of the fixing means carried by the associated body element. As a function of the architecture of the upper part of the engine compartment, the multifunctional support 10 may be fixed to any body elements. For example, it may be a liner of an A pillar 11 and/or a fender support 12 (FIG. 3). These means for fixing the multifunctional support 10 to the body elements 11, 12 may be of any kind, such as screwing, snap-fastening or equivalent means. The fixing elements with which the multifunctional support 10 is equipped may then be of any kind, for example they may include at least one opening 13 (here four openings) intended to have passed through them subsequently a screw 14 fastened to the associated body element or engaged in the latter. It may alternatively consist of a nut-and-bolt system.

In accordance with one important feature, the multifunctional support 10 also includes mounting elements intended to retain on the multifunctional support 10 one or more functional elements defined hereinafter, chosen from the following list:

- all or part of a water box (FIGS. 3 and 4) intended to collect water and/or to separate it from air to be routed into a ventilation circuit of the vehicle,
- at least one headlamp intended to provide a lighting function,
- a hood 29 intended to close an engine compartment of the vehicle in a closed position of the hood.

Figure 1:
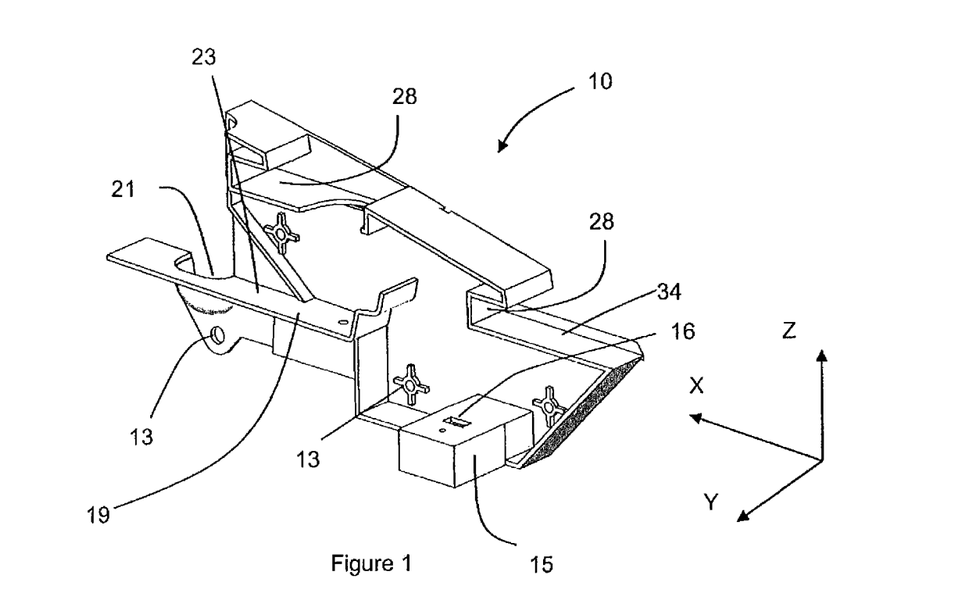
FIGS. 1 and 2 are respectively front and rear perspective views of a first embodiment of a multifunctional support in accordance with the invention.
Figure 2:
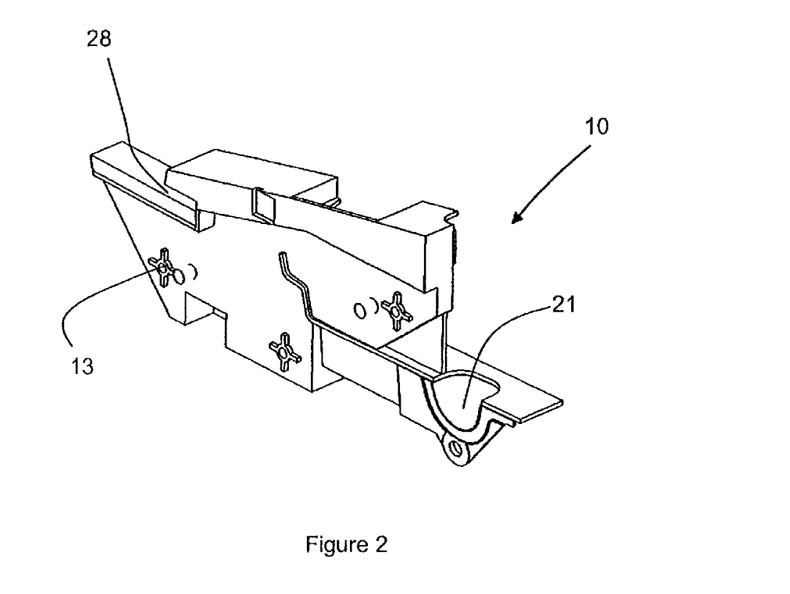
Figure 4:
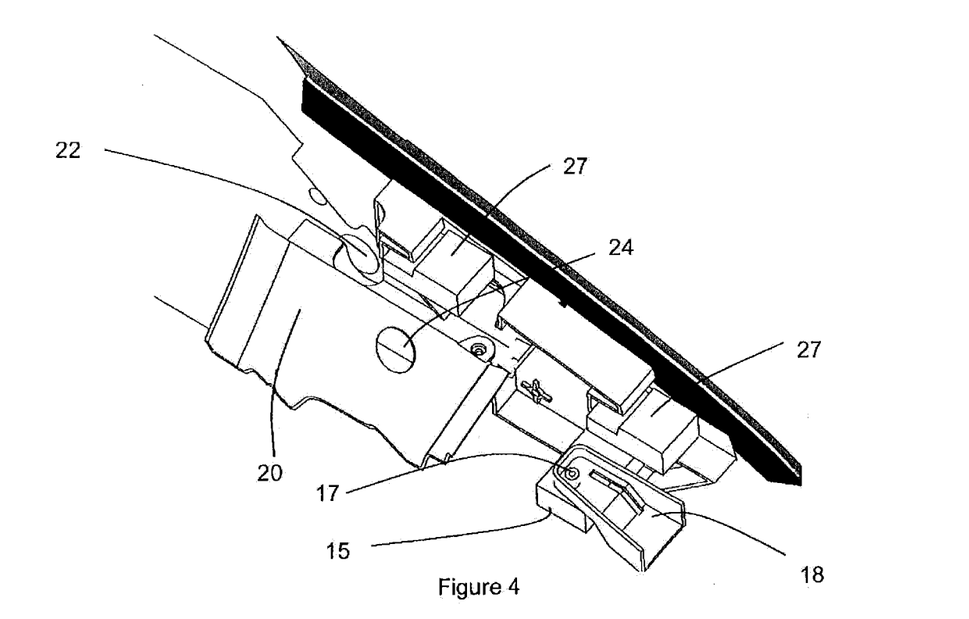

In the particular case where the multifunctional support 10 includes elements for mounting at least one headlamp, these may be of any kind, notably according to the construction of this headlamp. They may for example take the form of a fixing lug 15 adapted to project in the direction Y relative to the rest of the multifunctional support 10, in the direction intended to face in the direction of the interior of the engine compartment, away from the lateral fender of the bodywork. The fixing lug 15 may include an opening 16 (FIG. 1) for a fixing member 17 (FIG. 4) to pass through itself carried by an arm 18 fastened to the rest of the headlamp (not shown completely). FIGS. 3 and 4, which show partially in perspective one example of an arrangement for a motor vehicle in accordance with the invention utilizing the multifunctional support 10 from FIGS. 1 and 2, show these elements.

In the particular case where the multifunctional support 10 includes elements for mounting all or part of a water box, these elements may be of any kind, notably in accordance with the design of this water box. FIGS. 1 to 6 represent a particular case in which the multifunctional support 10 includes mounting elements intended to retain only part of the water box, the latter advantageously being formed in three parts to facilitate fitting it. These mounting elements fastened to the multifunctional support 10 advantageously include an end closure element 19 of the water box, this end element 19 therefore being fastened to the multifunctional support 10. The end element 19 is configured so as to be able to support one longitudinal end of a central closure element 20 of the water box. To form a water box it is therefore necessary to provide two supports 10 on respective opposite sides of the central element 20 common to the two end elements 19.

The central element 20 is notably intended to collect water coming for example from the flow over the windshield of the vehicle. It may optionally also serve to route the collected water to the end element 19. This is notably the case when the arrangement, which includes the body elements to which the multifunctional support 10 is fixed, additionally includes a pipe 22 for discharging the outflow of water from the water box. This discharge pipe 22 intended to convey the water to the engine compartment located under the water box may be equipped with a closure flap at the level of the body element to which the multifunctional support is fixed. The water then flows for example in the space between the A pillar liner 11 and the lateral fender of the vehicle. The flap is intended to prevent problems of noise coming from the road or from the front of the vehicle. It is then advantageous for the end element 19 to include a water guiding element 21, for example in the form of a concave shape, configured to collect water routed by the central element 20 and to channel it off the multifunctional support 10 to the discharge pipe 22.

This is why (see FIGS. 2 and 4 in particular) the end element 19 of the water box fastened to the multifunctional support 10 has on the side directed toward the body element to which it is intended to be fixed a concave shape adapted to channel in the longitudinal direction of the water box the outflow from the water box of water collected by the central element 20. It should be made clear that conventionally, although not exclusively, the longitudinal direction of the water box, corresponding to the overall direction of the flow of water along the largest dimension of the central element 20, is oriented parallel to the direction Y transverse to the vehicle.

By way of nonlimiting example, the end element 19 includes an upper face 23 in the form of a rim on which the corresponding longitudinal end of the central element 20 is intended to come to bear by overlapping it from above. Thanks to such an arrangement, the water box may advantageously be mounted on the body in two stages:

- firstly by fixing each of the multifunctional supports 10 to an associated element 11, 12 of the body,
- then by fixing the central element 20 of the water box to the end elements 19 fastened to the supports 10 previously fixed to the body.

Accordingly, to fix the central element 20 to each of the end elements 19 its corresponding longitudinal end is placed on the end element 19 and then fixed in the area of overlap, for example by means of at least one fixing screw (not shown).

As a result, the central element 20 overlies the end elements 19, encouraging natural sideways outflow of the water. The overlap zone or distance is at least 7 mm for example along the direction Y transverse to the vehicle. The overlap zone is for example at most 20 mm, notably 10 mm, along the direction Y transverse to the vehicle.

To ensure improved retention of the central element 20 after fixing it to the end elements 19, the central element 20 may include elements for fixing it to at least one associated element of the body such as a firewall upper crossmember of the body.

By virtue of an appropriate organization of the central elements 20 and the end elements 19, the fixing of the central element 20 may advantageously include a step of placing the central element 20 on the end elements 19 by moving the central element 20 in a plane (X, Z) perpendicular to the transverse direction Y of the body of the vehicle.

Each end element 19 therefore extends toward the interior of the vehicle along the direction Y transverse to the body of the vehicle beyond the interior edge of the rest of the multifunctional support 10 in order to enable the central element 20 to pass between the supports 10 when mounting the central element 20 along the path substantially inscribed within a vertical plane (X, Z) that is longitudinal relative to the body of the vehicle. By "interior edge" is meant the edge of the support 10 (outside the end element 19) located toward the interior of the vehicle, i.e. closest to the longitudinal and vertical median plane of the vehicle.

It is then necessary, where possible, to limit the congestion resulting from the presence of the end elements 19. The ratio between the longitudinal dimension of the central element 20 (considered along the longitudinal direction of the water box, here along the direction Y) and the longitudinal dimension of each of the end elements 19 (also considered in the same direction) is greater than 10. In other words, the ratio of the lengths of the central element 20 and each of the end elements 19 is greater than 10, these lengths being considered along the direction Y transverse to the body of the vehicle. For example, each end element 19 has a dimension along the transverse direction Y that is less than 150 mm, notably less than 100 mm.

This facilitates fitting the water box, for example to the firewall upper crossmember above a windshield wiper mechanism fixed previously. The windshield wiper spindles then pass through openings 24 (FIG. 4) in the water box, said openings provided for this purpose within the thickness of the central element 20. This arrangement therefore makes it possible to get around the impossibility of moving the water box along the direction Y transverse to the vehicle.

On the other hand, the end element 19 includes a waterproofing element 25 intended to be disposed between the end element 19 and the central element 20 in the area of overlap.

Moreover, the multifunctional support 10 includes, at the level of the end element 19, a bearing element 26 intended to come to bear in a watertight manner on the firewall upper crossmember of the body.

In the particular case where the multifunctional support 10 includes elements for mounting the hood 29 (FIGS. 8 to 10) on the multifunctional support 10, those elements include positioning elements (described in detail below) configured to prevent any movement having a vertical component between the multifunctional support 10 and the hood 29 when it is in the closed position. In other words, of their own accord and without necessitating other retaining means for immobilizing the hood 29 in the upward direction, the positioning elements fastened to the support or supports 10 prevent any possibility of movement in translation of the hood in the direction Z and/or any possibility of rotation of the hood about Y and/or X.

Figure 5:
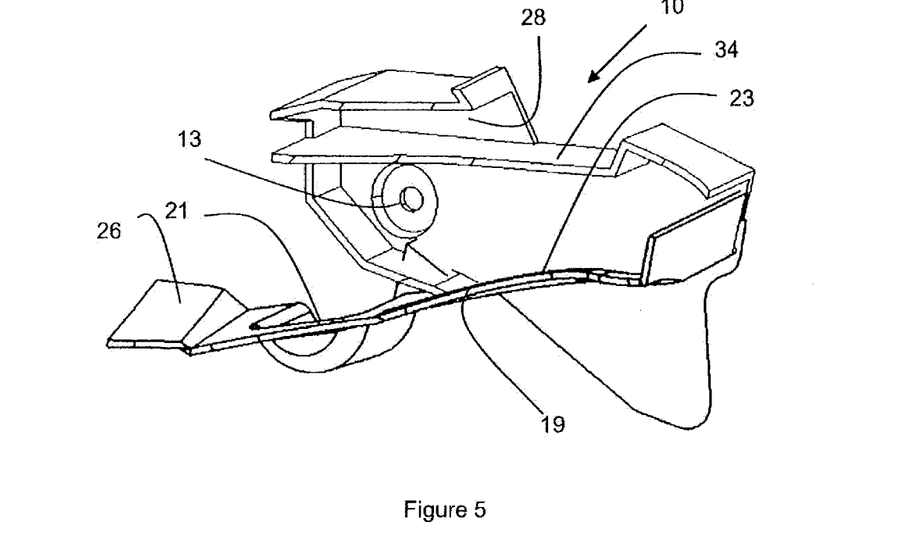
FIG. 5 is a perspective view of a second embodiment of a multifunctional support in accordance with the invention.
Figure 6:
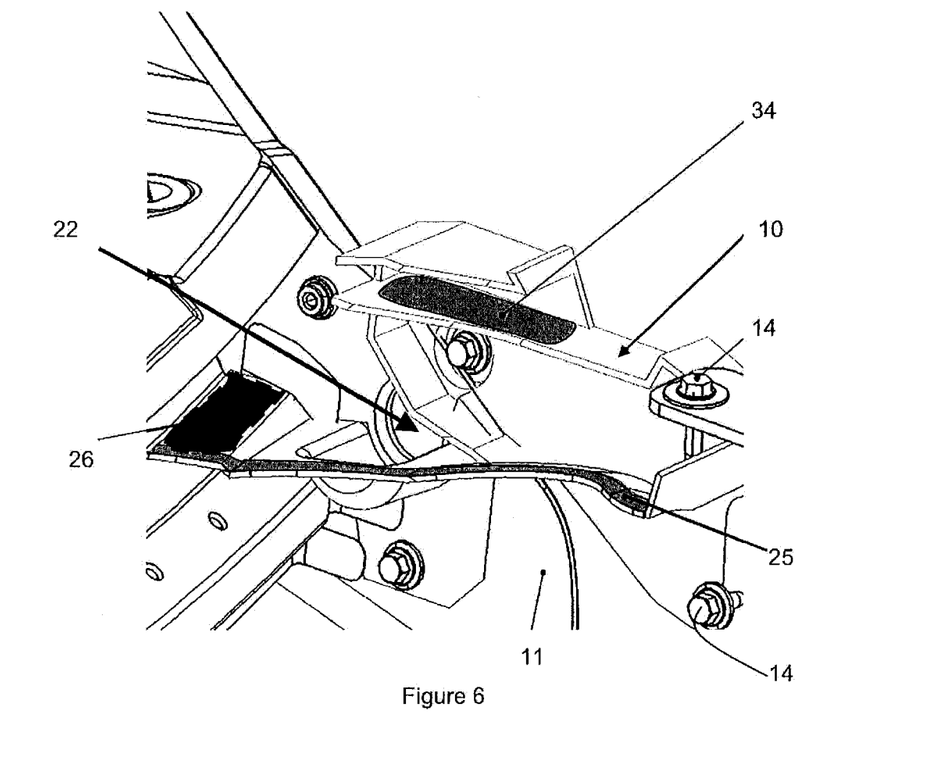
FIG. 6 represents partially one example of an arrangement for an automobile vehicle in accordance with the invention utilizing the multifunctional support from FIG. 5, FIGS. 7 and 8 represent one example of a locking mechanism in an unlocked configuration.

As notably shown in FIGS. 1, 3 and 4 for the first embodiment and FIGS. 5 and 6 for the second embodiment, the positioning elements fastened to the multifunctional support 10 include at least one first member intended to be engaged by sliding in a second member fastened to the hood 29 on sliding the hood 29 relative to the multifunctional support 10 in a first direction (here in the direction of the rear of the vehicle along X), notably in a substantially horizontal direction (here along X). The first member is disengaged from the second member fastened to the hood by sliding the hood 29 relative to the multifunctional support 10 in a second direction (here in the direction of the front of the vehicle along X) opposite the first direction. The first and second members respectively fastened to the support 10 and the hood 29 may be of any kind. In the first embodiment shown, each of the two second members with which the hood 29 is equipped includes at least one fixing lug 27 which, on sliding of the hood 29 in the first direction (toward the rear of the vehicle along X), is inserted in a corresponding retaining housing 28 with which the first member of the multifunctional support 10 is equipped. In other words, the multifunctional support 10 includes at least one retaining housing 28, of which there are for example two in the first embodiment, configured to allow mounting of the corresponding fixing lug 27 fastened to the hood 29 by sliding it in the first direction.

It is possible to provide the reverse form of mounting, namely with each of the two first members with which the multifunctional support 10 is equipped including at least one fixing lug (not shown) which, on sliding of the hood 29 in the first direction, is inserted in a corresponding retaining housing (not shown) with which the second member of the hood 29 would then be equipped.

In the second embodiment from FIGS. 5 and 6, the multifunctional support 10 includes only one retaining housing 28 and the second member of the hood includes only one lug 27.

When each of the fixing lugs (whether fastened to the hood 29 or the multifunctional support 10) is engaged by sliding in the corresponding retaining housing 28 (which is therefore part of the multifunctional support or the hood 29, respectively, depending on the variant), the hood 29 is positioned and retained so that all movement of the hood along Z is prevented.

Operation follows from what is described above, namely the positioning elements are configured so as to be activated by sliding of the hood 29 relative to the multifunctional support 10 in a first direction (here in the direction of the rear of the vehicle along X) and to be deactivated by sliding of the hood 29 relative to the multifunctional support 10 in a second direction (here in the direction of the front of the vehicle along X) opposite the first direction, notably in a substantially horizontal direction (for example along X).

Moreover, the positioning elements include at least one lower abutment element intended to immobilize the hood 29 in the downward direction along Z when it is in the closed position. Each of these abutment elements consists for example of the bottom 34 of a given retaining housing 28 (see FIGS. 1 and 5).

In an advantageous embodiment the multifunctional support 10 consists of a one-piece part notably made from plastic material or metal. This has the advantage of easy procurement, manipulation, storage, etc.

At least one such multifunctional support 10 may be used in the organization of an arrangement for a motor vehicle in accordance with the invention, also including an associated element of the body of the vehicle, such as a fender support 12 and/or an A pillar liner 11, on which said at least one multifunctional support 10 is fixed. The arrangement further includes at least one functional element retained on the multifunctional support 10, selected from the following:

- all or part of the water box, for example that described above,
- at least one headlamp,
- the hood 29, of whatever kind.

Two multifunctional supports 10 may notably be disposed on respective opposite sides of the hood 29 and/or the central element 20 of the water box, along the direction Y transverse to the vehicle. This promotes retention and positioning of the hood 29 on each of its lateral sides when it is in the closed position.

The arrangement may include a locking mechanism varying between a locking configuration preventing deactivation of the positioning elements and an unlocking configuration allowing activation of the positioning elements. The locking mechanism is disposed for example at a front edge of the hood 29 near the front grille of the vehicle.

Figure 7:
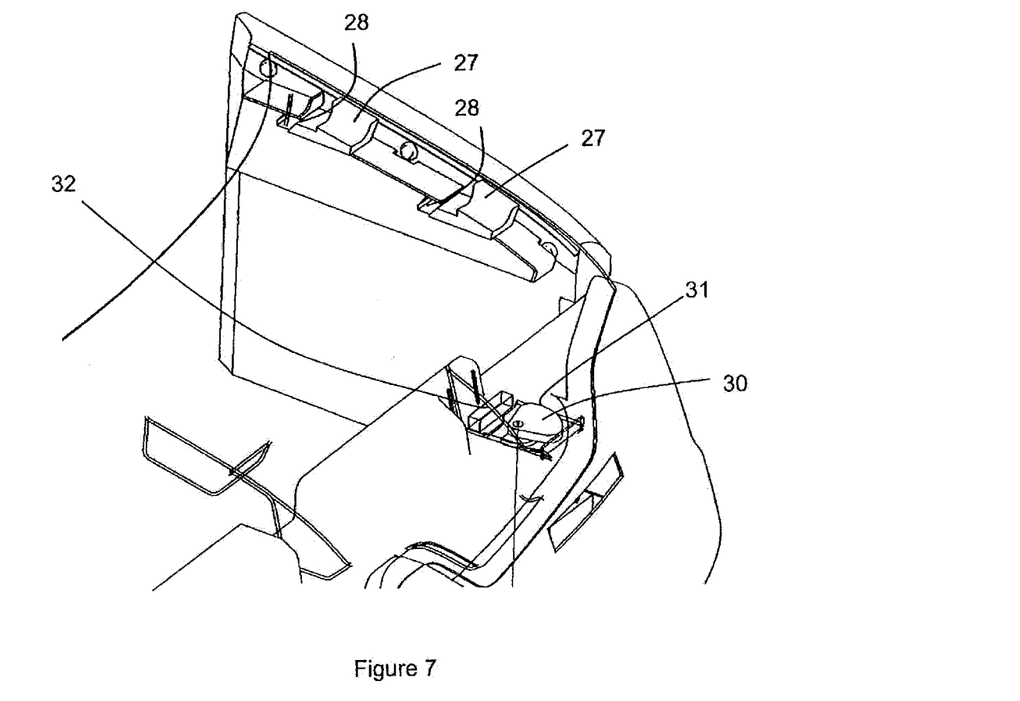
Figure 8:
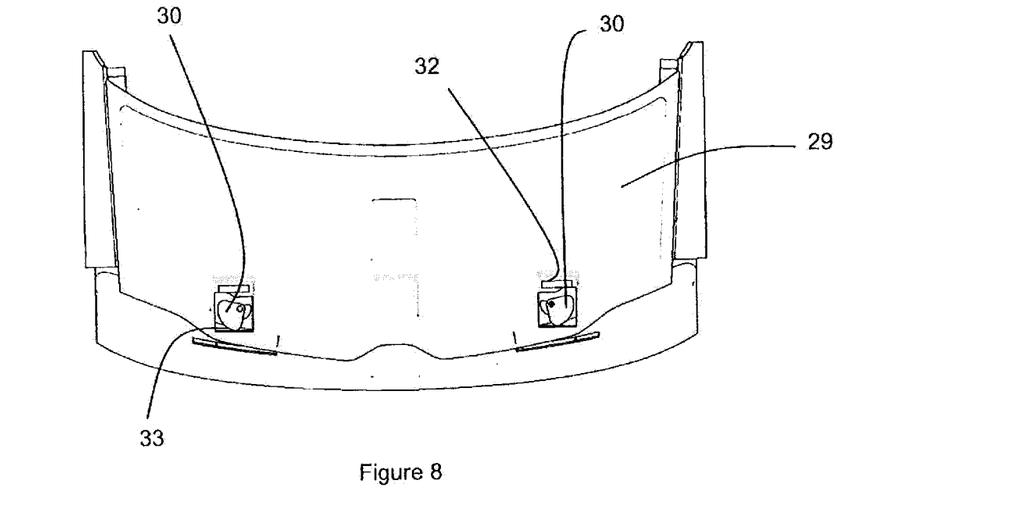
Figure 9:
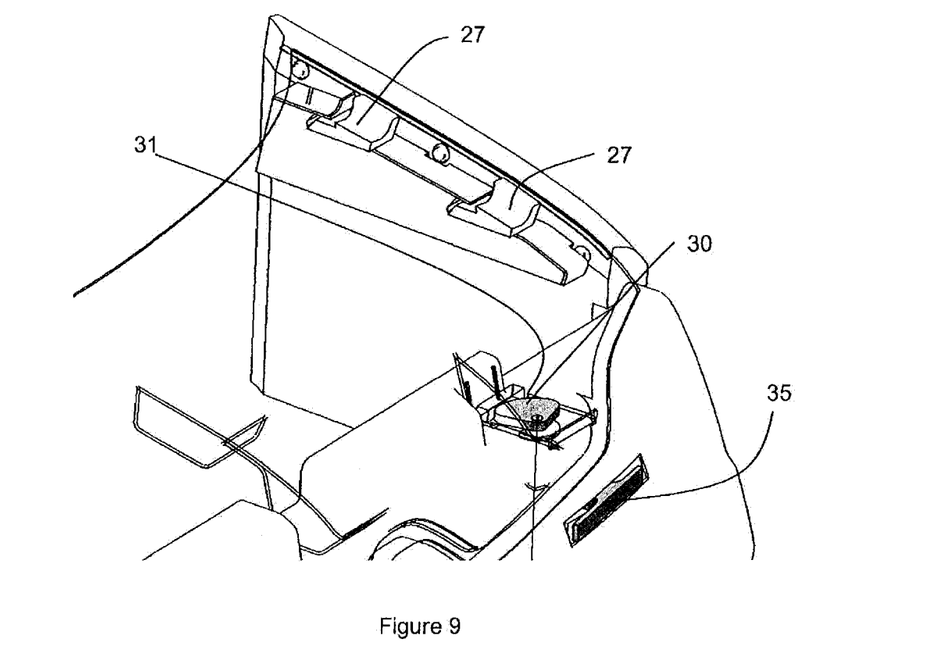
FIGS. 9 and 10 represent the locking mechanism in a locked configuration.
Figure 10:
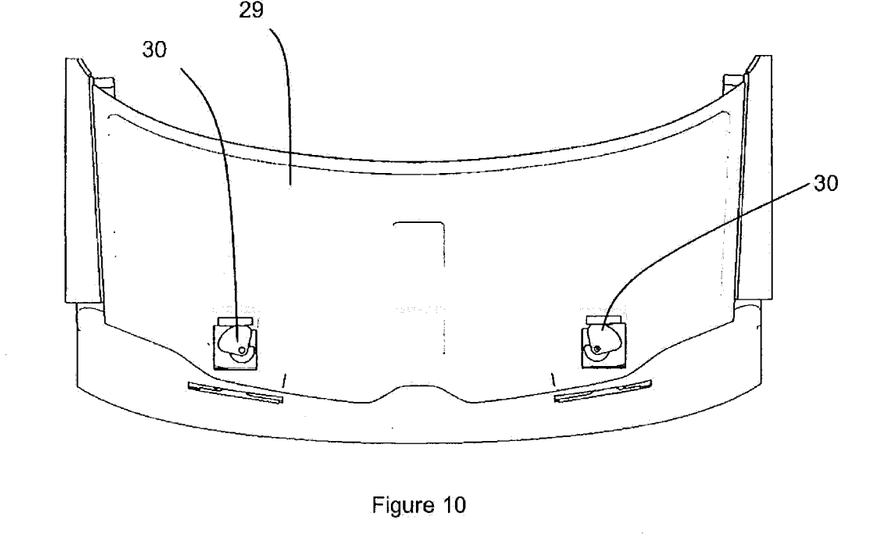

As more particularly represented in FIGS. 7 to 10, the locking mechanism may be of any kind, notably according to the design of the positioning elements fastened to the multifunctional support. The locking mechanism may include at least one bolt 30 (here two bolts) varying between a locking position corresponding to the locking configuration (FIGS. 9 and 10) and an unlocking position corresponding to the unlocking configuration (FIGS. 7 and 8). The bolt 30 has a cam surface 31 (FIG. 7) configured to cooperate with a bearing element 32 fastened to the hood 29 so as to drive the sliding of the hood 29 in the first direction when the bolt 30 passes from the unlocking position to the locking position. In other words, the locking mechanism is configured so that, by virtue of the cam surface 31 bearing on the bearing element 32, the passage of the locking mechanism from the unlocking configuration to the locking configuration causes sliding of the hood 29 relative to the multifunctional support 10 in the first direction.

The variation of the bolt 30 from the unlocking position to the locking position or vice versa is effected by rotation of the bolt 30. The bolt 30 is also provided with an actuating element 35 (FIG. 9) such as a rod or the like configured so as to be able to control the variation of the bolt 30 from the unlocking position to the locking position or vice versa.

Each bolt 30 of the locking mechanism is accommodated in the closed position of the hood in a hole 33 in the hood 29, notably in the hood liner, this hole 33 being configured so as to allow the variation of the bolt 30 from the unlocking position to the locking position or vice versa.

The invention therefore proposes a multifunctional support that makes it possible to facilitate the mounting of particular functional elements, each at its exact location and complying with the leveling and the clearances of the elements relative to one another. This mounting is effected rapidly, without requiring trial and error and without using costly tools.

The invention claimed is:

1. A multifunctional support configured for mounting functional elements of a motor vehicle on a body of the vehicle, the multifunctional support comprising:
   fixing elements configured to fix the multifunctional support to at least one associated element of the body,
   mounting elements configured to retain on the multifunctional support at least one headlamp configured to provide a lighting function,
   mounting elements configured to retain on the multifunctional support a hood configured to close an engine compartment of the vehicle in a closed position of the hood, the mounting elements including two retaining housings on a same side of the engine compartment, each of the retaining housings having an opening in a longitudinal direction of the vehicle to receive a corresponding fixing lug which, on sliding of the hood in a first direction, is inserted through the opening in the retaining housing, and each of the retaining housings including a bottom surface to immobilize the h d in a downward direction and a top surface positioned above the bottom surface to immobilize the hood in an upward direction, the retaining housings mounting the hood to the vehicle without an articulated hood mounting, and
   mounting elements configured to retain on the multifunctional support part of a water box configured to collect water and/or to separate water from air to be routed into a ventilation circuit of the vehicle,
   wherein the mounting elements configured to retain part of the water box include an end closure element of the water box, the end element being fastened to the multifunctional support and configured to support one longitudinal end of a central closure element of the water box.

2. The multifunctional support as claimed in claim 1, wherein each fixing lug is configured to be removed from the corresponding retaining housing by sliding of the hood relative to the multifunctional support in a second direction opposite the first direction, or in a substantially horizontal direction.

3. The multifunctional support as claimed in claim 1, wherein the central element is configured to collect water and to route the water to the end element, the end element includes a water guiding element configured to collect water routed by the central element and to channel the water off the multifunctional support.

4. The multifunctional support as claimed in claim 3, wherein the water guiding element of the end element has a concave shape.

5. The multifunctional support as claimed in claim 1, wherein the end lent includes an upper face on which the longitudinal end of the central element is configured to come to bear by overlapping the upper face from above.

6. The multifunctional support as claimed in claim 5, wherein the longitudinal end of the central element overlaps the upper face of the end element for 20 mm or less in a transverse direction.

7. The multifunctional support as claimed in claim 1, wherein the end element includes a waterproofing element configured to be disposed between the end element and the central element.

8. The multifunctional support as claimed in claim 1, wherein the end element includes a bearing element configured to come to bear in watertight manner on a firewall upper crossmember of the body.

9. A motor vehicle comprising at least one multifunctional support as claimed in claim 1, an associated element of the body of the vehicle to which the at least one multifunctional support is fixed, and at least one functional element retained on the multifunctional support, chosen from:
   all or part of a water box configured to collect water and/or to separate the water from air to be routed into a ventilation circuit of the vehicle,
   at least one headlamp configured to provide a lighting function,
   a hood configured to close an engine compartment of the vehicle in a closed position of the hood.

10. The vehicle as claimed in claim 9, comprising two multifunctional supports disposed on respective opposite sides of the hood and/or the central closure element of the water box along a direction transverse to the vehicle.

11. The vehicle as claimed in claim 9, further comprising a locking mechanism varying between a locking configuration preventing deactivation of each of the retaining housings and the corresponding fixing lug and an unlocking configuration allowing activation of each of the retaining housings and the corresponding fixing lug.

12. The vehicle as claimed in claim 11, wherein the locking mechanism is configured so that passage of the locking mechanism from the unlocking configuration to the locking configuration causes sliding of the hood relative to the multifunctional support in the first direction.

13. The multifunctional support as claimed in claim 1, wherein the end element extends further in a transverse direction towards a longitudinal and vertical median plane of the vehicle than the rest of the multifunctional support.

14. The multifunctional support as claimed in claim 1, wherein the retaining housing is located within an upper surface of the multifunctional support.

15. The multifunctional support as claimed in claim 14, wherein there are two retaining housings located within the upper surface of the multifunctional support.

16. The multifunctional support as claimed in claim 1, wherein the fixing elements configured to fix the multifunctional support to the at least one associated element of the body pass through holes in a wall of the multifunctional support that extends in a vertical direction, and the mounting elements configured to retain on the multifunctional support the at least one headlamp include a fixing lug that extends from an inner surface of the wall in a direction toward an interior of the vehicle.

17. The multifunctional support as claimed in claim 1, wherein the at least one associated element of the body is a fender support or an A pillar liner.

\* \* \* \* \*